(12) United States Patent
Zhang et al.

(10) Patent No.: US 8,520,353 B2
(45) Date of Patent: Aug. 27, 2013

(54) ELECTRONIC DEVICE WITH SURGE SUPPRESSION CIRCUIT

(75) Inventors: Jun-Wei Zhang, Shenzhen (CN); Jun Zhang, Shenzhen (CN); Tsung-Jen Chuang, Tu-Cheng (TW); Shih-Fang Wong, Tu-Cheng (TW)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 166 days.

(21) Appl. No.: 13/053,222

(22) Filed: Mar. 22, 2011

(65) Prior Publication Data

US 2012/0194959 A1 Aug. 2, 2012

(30) Foreign Application Priority Data

Jan. 28, 2011 (CN) .......................... 2011 1 0031031

(51) Int. Cl.
*H02H 3/22* (2006.01)
(52) U.S. Cl.
USPC .......................................................... 361/111
(58) Field of Classification Search
USPC .................................................. 361/56, 111
See application file for complete search history.

(56) References Cited

U.S. PATENT DOCUMENTS

| | | | | |
|---|---|---|---|---|
| 4,445,055 A | * | 4/1984 | Bete ............................... | 327/434 |
| 4,634,814 A | * | 1/1987 | Pommer, II .................... | 379/377 |
| 5,208,719 A | * | 5/1993 | Wei ................................ | 361/56 |
| 5,748,093 A | | 5/1998 | Swanson et al. | |
| 5,754,797 A | * | 5/1998 | Takahashi ...................... | 710/302 |
| 5,798,951 A | * | 8/1998 | Cho et al. ....................... | 710/303 |
| 7,715,163 B2 | * | 5/2010 | Lee et al. ....................... | 361/93.9 |
| 2004/0177201 A1 | * | 9/2004 | Cherniski et al. .............. | 710/302 |

* cited by examiner

*Primary Examiner* — Jared Fureman
*Assistant Examiner* — Kevin J Comber
(74) *Attorney, Agent, or Firm* — Altis Law Group, Inc.

(57) ABSTRACT

An electronic device includes a power input pin receiving a voltage from an external power supply, a load, and a surge suppression circuit connected between the power input pin and the load. The surge suppression circuit includes a first transistor, a voltage divider circuit and a capacitor. The first transistor includes a control end, a first conductive end connected to the power input pin, and a second conductive end connected to the load. The voltage divider circuit includes a common node connected to the control end, one end of the voltage divider circuit connected between the first conductive end and the power input pin, and the other end of the voltage divider circuit connected to ground. One end of the capacitor is connected between the second conductive end and the load, and the other end of the capacitor is connected to the control end.

15 Claims, 3 Drawing Sheets

ELECTRONIC DEVICE WITH SURGE SUPPRESSION CIRCUIT

BACKGROUND

1. Technical Field

The present disclosure relates to surge management, and more particularly, to an electronic device with a surge suppression circuit.

2. Description of Related Art

Capacitors and induction coils are basic electronic components of an electronic device. However, when the electronic device is instantaneously connected with an external power supply, initial voltage applied to the capacitors rises so fast that a current surge may be generated. In addition, when the external power supply is instantaneously disconnected from the electronic device, self induction of the induction coils may occur, and a voltage surge or current surge is generated. The current surge or voltage surge may result in a tenfold or even hundredfold spike, deteriorating performance of the electronic components, shortening lifetime of the electronic device, or even permanently disabling the device.

What is needed, therefore, is an electronic device which can overcome the described limitations.

BRIEF DESCRIPTION OF THE DRAWINGS

The components in the drawings are not necessarily drawn to scale, the emphasis instead placed upon clearly illustrating the principles of at least one embodiment. In the drawings, like reference numerals designate corresponding parts throughout the various views.

DETAILED DESCRIPTION

Reference will now be made to the drawings to describe certain exemplary embodiments of the present disclosure in detail.

Figure 1:
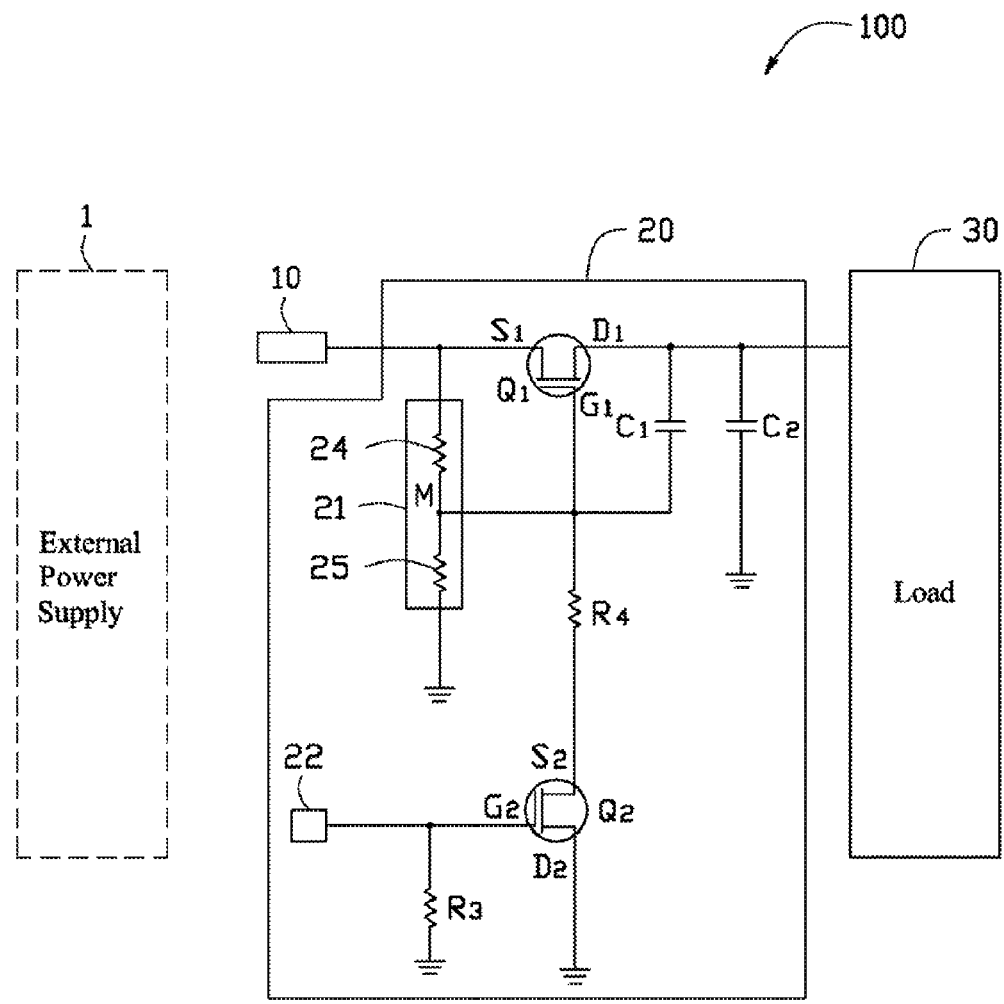
FIG. 1 is a schematic block diagram of an electronic device according to a first embodiment of the present disclosure.

Referring to FIG. 1, a schematic diagram of an electronic device 100 according to a first embodiment of the present disclosure is shown. The electronic device 100 includes a power input pin 10, a surge suppression circuit 20 and a load 30. The load 30 includes many basic electronic components (not shown), such as capacitors and induction coils. The surge suppression circuit 20 is connected between the power input pin 10 and the load 30, and is configured to suppress a current surge or voltage surge.

The surge suppression circuit 20 includes a voltage divider circuit 21, a first transistor Q1, a first capacitor C1, a second capacitor C2, a sensing electrode pin 22, a bias resistor R3, a discharging resistor R4, and a second transistor Q2. The voltage divider circuit 21 includes a first voltage dividing element 24 and a second voltage dividing element 25 connected in series. A common node M is defined between the first voltage dividing element 24 and the second voltage dividing element 25. The first transistor Q1 includes a control end G1, a first conductive end S1, and a second conductive end D1. The second transistor Q2 includes a control end G2, a first conductive end S2, and a second conductive end D2. In the embodiment, the first and second voltage dividing elements 24, 25 can, for example, be resistors.

One end of the power input pin 10 is connected to an external power supply 1, and the other to the first conductive end $S_1$ of the first transistor $Q_1$. The voltage divider circuit 21 is connected between the first conductive end $S_1$ of the first transistor $Q_1$ and ground. The control end $G_1$ of the first transistor $Q_1$ is connected to the common node M. The first capacitor $C_1$ is connected between the second conductive end $D_1$ and the control end $G_1$ of the first transistor $Q_1$. The second capacitor $C_2$ is connected between the second conductive end $D_1$ of the first transistor $Q_1$ and ground. The second conductive end $D_1$ of the first transistor $Q_1$ is further connected to the load 30. The first conductive end $S_2$ of the second transistor $Q_2$ is connected to the control end $G_1$ of the first transistor $Q_1$ via the discharging resistor $R_4$. The second conductive end $D_2$ of the second transistor $Q_2$ is connected to ground. The control end $G_2$ of the second transistor $Q_2$ is connected to ground via the bias resistor $R_3$. One end of the sensing electrode pin 22 is connected to the external power supply 1, and the other end of the sensing electrode pin 22 is connected to the control end $G_2$ of the second transistor $Q_2$. In the illustrated embodiment, both the power input pin 10 and the sensing electrode pin 22 can, for example, be rectangularly shaped, with the power input pin 10 longer than the sensing electrode pin 22. Especially, both the power input pin 10 and the sensing electrode pin 22 can, for example, be two terminals of an electronic connector connected to the external power supply 1. The first transistor $Q_1$ can, for example, be an n-channel field-effect transistor (FET), the second transistor $Q_2$ can, for example, be a p-channel FET, wherein the control ends $G_1$, $G_2$, the first conductive end $S_1$, $S_2$, and the second conductive end $D_1$, $D_2$ thereof correspond to a gate electrode, a source electrode and a drain electrode, respectively. In alternative embodiments, the discharging resistor $R_4$ can be omitted.

Operation of the electronic device 100 is as follows.

When the electronic device 100 is connected to the external power supply 1, the power input pin 10 is connected to the external power supply 1 prior to the sensing electrode pin 22, due to its length. As soon as the power input pin 10 is connected to the external power supply 1, the first capacitor $C_1$ is accordingly charged by the external power supply 1 via the voltage divider circuit 21 irrespective of whether the sensing electrode pin 22 is connected to the external power supply 1. An electric potential of a polar plate of the first capacitor $C_1$ connected to the control end $G_1$ of the first transistor $Q_1$ increases gradually.

When the electric potential reaches a certain value, the first transistor $Q_1$ is switched on. Accordingly, a voltage output by the external power supply 1 is gradually applied to the load 30 via the first transistor $Q_1$ at the time when the electronic device 100 is connected to the external power supply 1. Therefore, a current surge can be suppressed. The second capacitor $C_2$ is charged by the external power supply 1 via the first transistor $Q_1$, in order to stabilize the voltage applied to the load 30.

In addition, during the time after the power input pin 10 is connected to the external power supply 1 and before the sensing electrode pin 22 is connected to the external power supply 1, the control end $G_2$ of the second transistor $Q_2$ is connected to ground via the bias resistor $R_3$, and an electric potential of the control end $G_2$ is substantially equivalent to 0V. The first conductive end $S_2$ of the second transistor $Q_2$ is connected to the common node M via the discharging resistor $R_4$, and an electric potential of the first conductive end $S_2$ is higher than 0V. Therefore, the second transistor $Q_2$ is switched on, and the discharging resistor $R_4$ is connected in parallel to the second voltage dividing element 25 via the second transistor $Q_2$. After the sensing electrode pin 22 is connected to the external power supply 1, the electric potential of the control end $G_2$ is disconnected to the second voltage dividing element 25.

Once the external power supply 1 is disconnected from the electronic device 100, the sensing electrode pin 22 is disconnected from the external power supply 1 prior to the power input pin 10, because the sensing electrode pin 22 is shorter than the power input pin 10. Accordingly, during the time before the power input pin 10 is disconnected from the external power supply 1 and after the sensing electrode pin 22 is disconnected from the external power supply 1, the second transistor $Q_2$ is switched on. The first capacitor $C_1$ discharges via the discharging resistor $R_4$ and the second transistor $Q_2$. Therefore, the electric potential of the polar plate of the first capacitor $C_1$ connected to the control end $G_1$ of the first transistor $Q_1$ decreases, and correspondingly, the first transistor $Q_1$ varies from on to a little switching-off state or even off before the power input pin 10 is disconnected from the external power supply 1, as long as the discharging resistor $R_4$ is appropriately chosen. Therefore, the voltage applied to the load 30 via the first transistor $Q_1$ does not decrease sharply when the power input pin 10 is disconnected from the external power supply 1. Accordingly, a voltage surge can be suppressed. After the power input pin 10 is disconnected from the external power supply 1, the external power supply 1 stops providing the voltage to the electronic device 100.

According to the operation described above, when the electronic device 100 having the surge suppression circuit 20 is connected to the external power supply 1, the first capacitor C1 is charged by the external power supply 1, and the first transistor Q1 shifts from off to on. Accordingly, the voltage output from the external power supply 1 is applied to the load 30 with a time delay. Therefore, when charging instantaneously, the surge suppression circuit 20 can prevent the load 30 from being damaged by a current surge, thereby protecting the electronic device 100.

Furthermore, when the electronic device 100 is instantaneously disconnected from the external power supply 1, the sensing electrode pin 22 is disconnected from the electronic device 100 prior to the power input pin 10. The second transistor Q2 is switching on during the time before the power input pin 10 is disconnected from the external power supply 1 and after the sensing electrode pin 22 is disconnected from the external power supply 1. Accordingly the first capacitor C1 discharges via the discharging resistor R4, and correspondingly, the first transistor Q1 shifts from on to off. Therefore, the voltage output to the load 30 does not decrease sharply when the power input pin 10 is disconnected from the external power supply 1. Therefore, the surge suppression circuit 20 can further prevent the load 30 from being damaged by a voltage surge, thereby protecting the electronic device 100.

Figure 2:
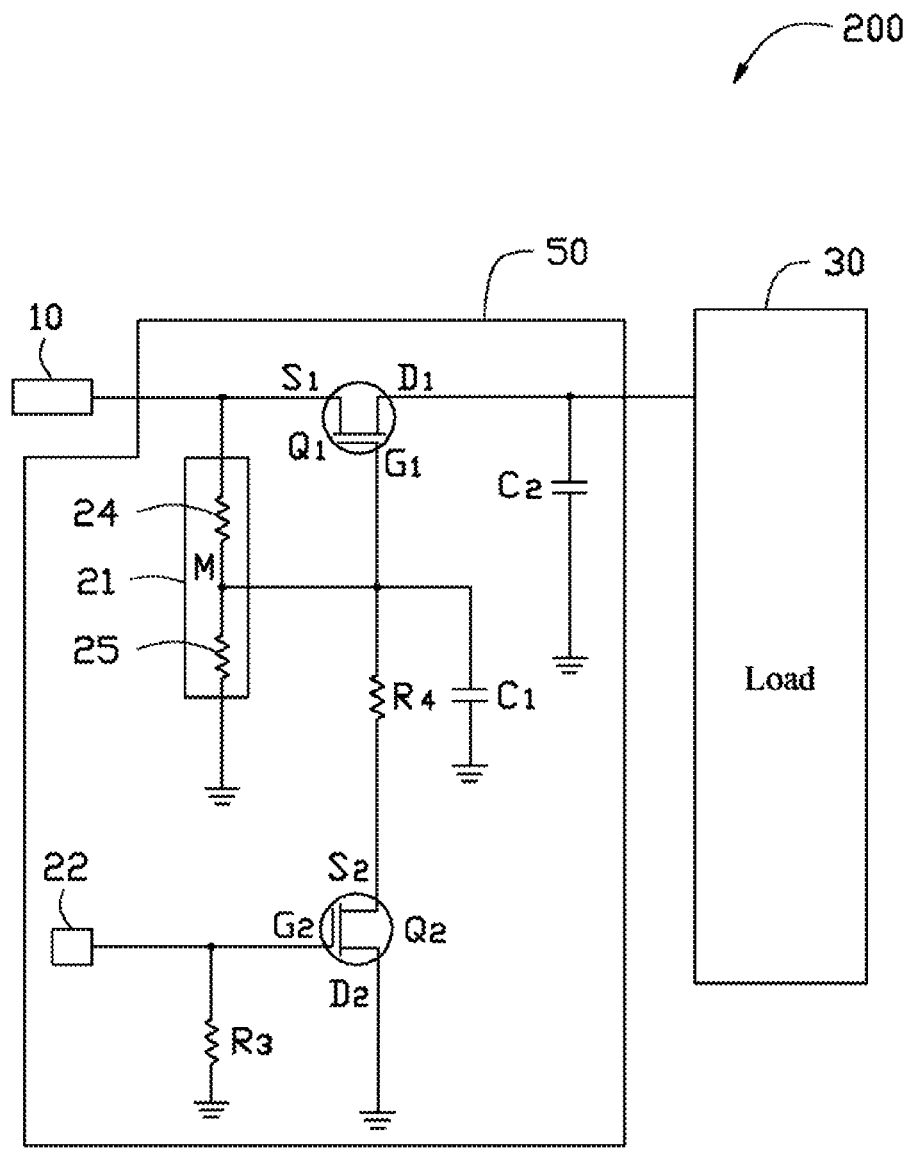
FIG. 2 is a schematic block diagram of an electronic device according to a second embodiment of the present disclosure.

Referring to FIG. 2, an electronic device 200 according to a second embodiment of the present disclosure differs from the electronic device 100 of the first embodiment in that a first capacitor C1 of a surge suppression circuit 50 is connected between a control end G1 of a first transistor Q1 and ground.

Figure 3:
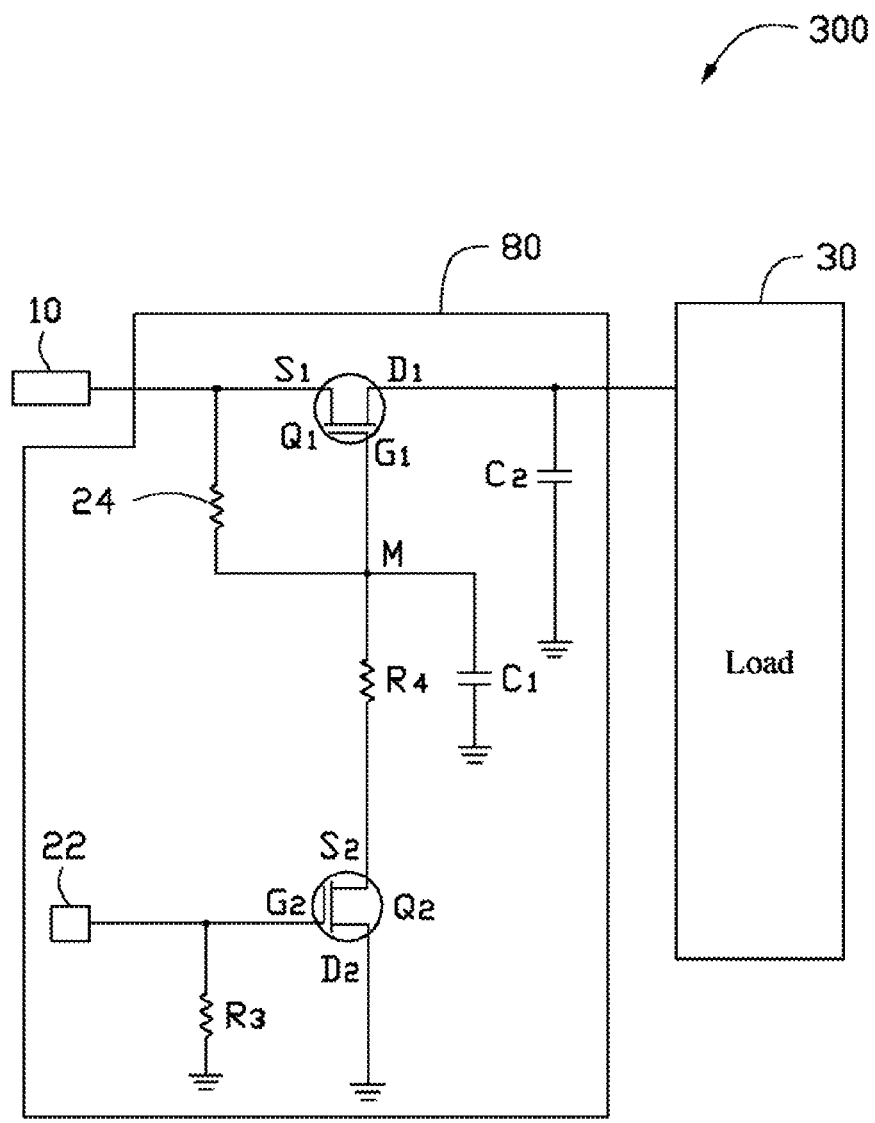
FIG. 3 is a schematic block diagram of an electronic device according to a third embodiment of the present disclosure.

Referring to FIG. 3, an electronic device 300 according to a third embodiment of the present disclosure differs from device 200 of the second embodiment in that the second voltage dividing element (not labeled) of a surge suppression circuit 80 is omitted.

Operations of the electronic devices 200, 300 are also similar to the operation of the electronic device 100.

It is to be further understood that even though numerous characteristics and advantages of a preferred embodiment have been set out in the foregoing description, together with details of the structures and functions of the embodiments, the disclosure is illustrative only; and that changes may be made in detail, especially in matters of shape, size and arrangement of parts within the principles of disclosure to the full extent indicated by the broad general meaning of the terms in which the appended claims are expressed.

What is claimed is:

1. An electronic device, comprising:
    a power input pin selectively connected to and disconnected from an external power supply;
    a load; and
    a surge suppression circuit connected between the power input pin and the load, the surge suppression circuit comprising:
        a sensing electrode pin selectively connected to and disconnected from the external power supply;
        a voltage divider circuit having a common node;
        a first capacitor charged by the external power supply via the common node of the voltage divider circuit;
        a first transistor connected between the power input pin and the load, and the first transistor being switched on and switched off according to the change of an electric potential of the first capacitor;
        a second transistor connected between the first transistor and ground, and the second transistor being switched on and switched off according to a voltage provided by the sensing electrode pin;
    wherein the second transistor varies from off to on upon the condition that a time when the sensing electrode pin is disconnected from the external power supply is previous to a time when the power input pin is disconnected from the external power supply.

2. The electronic device of claim 1, wherein the first transistor comprises a control end, a first conductive end and a second conductive end, the control end being connected to the common node, the first conductive end being connected to the power input pin, the second conductive end being connected to the load, and the first capacitor being connected between the control end and the second conductive end of the first transistor, the power input pin is connected to the load via the first conductive end and the second conductive end of the first transistor.

3. The electronic device of claim 2, wherein the second transistor comprises a control end, a first conductive end and a second conductive end, the control end of the second transistor being connected to the sensing electrode pin, the first conductive end of the second transistor being connected to the control end of the first transistor, and the second conductive end of the second transistor being connected to ground.

4. The electronic device of claim 3, wherein the surge suppression circuit further comprises a bias resistor connected between the control end of the second transistor and ground.

5. The electronic device of claim 4, wherein the surge suppression circuit further comprises a discharging resistor connected between the control end of the first transistor and the first conductive end of the second transistor.

6. The electronic device of claim 4, wherein the voltage divider circuit comprises a first voltage dividing element and a second voltage dividing element connected with the first voltage dividing element in series, and the common node is defined between the first voltage dividing element and the second voltage dividing element.

7. The electronic device of claim 1, wherein the first transistor comprises a control end, a first conductive end and a second conductive end, the control end being connected to the common node, the first conductive end being connected to the power input pin, the second conductive end being connected to the load, and the first capacitor being connected between the control end of the first transistor and ground, and the power input pin is connected to the load via the first conductive end and the second conductive end of the first transistor.

8. The electronic device of claim 7, wherein the second transistor comprises a control end, a first conductive end and a second conductive end, the control end of the second transistor being connected to the sensing electrode pin, the first conductive end of the second transistor being connected to the control end of the first transistor, and the second conductive end of the second transistor being connected to ground.

9. The electronic device of claim 8, wherein the surge suppression circuit further comprises a bias resistor connected between the control end of the second transistor and ground.

10. The electronic device of claim 9, wherein the voltage divider circuit comprises a first voltage dividing element connected between the first conductive end of the first transistor and the common node.

11. The electronic device of claim 10, wherein the voltage divider circuit further comprises a second voltage dividing element connected between the common node and ground.

12. The electronic device of claim 9, wherein the surge suppression circuit further comprises a discharging resistor connected between the control end of the first transistor and the first conductive end of the second transistor.

13. The electronic device of claim 9, wherein the surge suppression circuit further comprises a second capacitor connected between the second conductive end of the first transistor and ground.

14. The electronic device of claim 1, wherein the power input pin and the sensing electrode pin are both rectangularly shaped, and the power input pin is longer than the sensing electrode pin.

15. The electronic device of claim 1, wherein the first transistor is an n-channel field-effect transistor, and the second transistor is a p-channel field-effect transistor.

* * * * *